United States Patent [19]

Le Gallais

[11] 4,001,662
[45] Jan. 4, 1977

[54] VARIABLE CONTROL CURRENT GENERATOR ARRANGEMENT

[75] Inventor: Jacques J. Le Gallais, Viry Chatillon, France

[73] Assignee: Societe Controle Bailey, Clamart, France

[22] Filed: Feb. 21, 1975

[21] Appl. No.: 551,547

[30] Foreign Application Priority Data

Feb. 28, 1974 France .............................. 74.06912

[52] U.S. Cl. .............................. 318/564; 318/678; 330/124 D
[51] Int. Cl.² .............................................. G05B 9/02
[58] Field of Search .......... 318/678, 563, 564, 677, 318/681; 330/124 D

[56] References Cited

UNITED STATES PATENTS

| 3,405,337 | 10/1968 | Popik | 318/563 |
| 3,807,666 | 4/1974 | Devlin | 318/564 X |

*Primary Examiner*—B. Dobeck

[57] ABSTRACT

Variable current generator arrangement for controlling the position of remote load components allowing replacement of a main control current generator by an auxiliary control current generator. The main control current generator is a current injector with high output impedance. The auxiliary control current generator is a voltage follower with low output impedance. For performing switchover, a switch means allows the voltage across the load component to be applied to an analog store means and the voltage in said store means to be applied to the voltage follower.

2 Claims, 1 Drawing Figure

VARIABLE CONTROL CURRENT GENERATOR ARRANGEMENT

BACKGROUND OF THE INVENTION

1. Field of the Invention

The present invention relates to a direct current generator arrangement for the remote control of servo-controlled components.

2. Brief Description of the Prior Art

It is well known to control the position of remote electrically controlled components or loads by means of a variable direct current generator, the strength of the direct current being a function of the actual position of the component as detected by a sensor or being a function of the future position of the component as determined by a computer or the like.

When the current generator is out of order or is to be disconnected from the controlled component for maintenance purpose, it is necessary to substitute for it a standby or auxiliary current generator, the substitution being made with no interruption in the control. For this substitution, it is known to scan the output current of the auxiliary generator and to switch the load from the main current generator to the auxiliary current generator at the instant when the scanned output current of the auxiliary generator is equal to the output current of the main generator.

A drawback in logistics is encountered with the above solution. It is most often the case that the connection of the auxiliary generator to the load and the disconnection of the main generator from the load cannot be effected fully and simultaneously, for example, if it is made by means of a four-prong connector which is pushed in sideways connection or disconnection may suffer. In this case, the movable part of the controlled component e.g., the servo undergoes an undesirable changes of position. It may also happen that the auxiliary current generator is located far away from the main current generator and in this case the connect and disconnect and switchover operation will require a lengthy 4-lead extension cable. These drawbacks add cost and inconvenience in the prior art devices.

SUMMARY OF THE INVENTION

The present invention has for its purpose to eliminate the heretofore indicated drawbacks. To do so, in accordance with the invention, an auxiliary current generator arrangement of the type herein initially defined for the remote control of comprises an analog store which is able to copy out and store the actual voltage across the load terminals as developed by the main current generator, an operational amplifier mounted as a unity follower means for responding to the voltage directly applied at its input by the analog store and an inverter switch which is able to connect the terminals of load first to the terminals of the analog store and then to the amplifier output terminals.

Under these connection conditions at the amplifier output and analog store, the operational amplifier applies to the load terminals the copied out voltage stored in the analog store whatever the value of the current may be, which current is still being generated by the normal generator, and this precision in stored voltage in the analog store is due to the extremely low value of said amplifier output impedance in comparison to that of the normal generator.

BRIEF DESCRIPTION OF THE DRAWING

The invention will better be understood upon reading the description below in relation with the accompanying drawing in which the single FIGURE of drawing represents the main and auxiliary control generator arrangement of the invention.

DESCRIPTION OF THE PREFERRED EMBODIMENT

Figure 1:
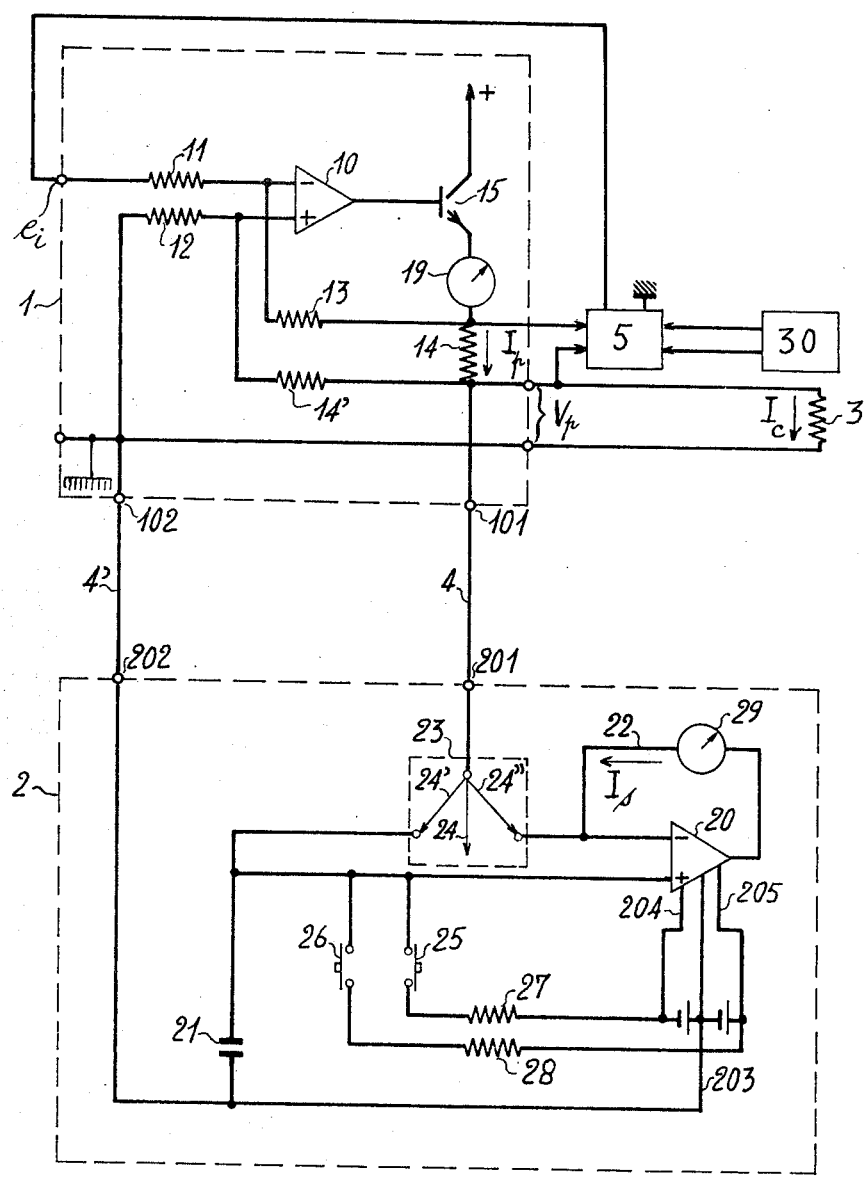

Referring to the FIGURE, the auxiliary generator 2 is intended to be substituted upon command for a high output impedance main current generator 1 in order to supply a load impedance 3 with a variable control direct current $I_c$. The following illustrates the preferred variable control current generator arrangement.

The main variable current generator 1 is of a known type and comprises an operational amplifier 10 and a transistor amplifier 15 which is disposed in relation to the amplifier as a current injector. Generator 1 is controlled by a signal $e_i$ applied to its inverting input. The emitter circuit of amplifier 15 comprises the control resistor 14 and the load impedance 3. It is well known that if the ratio between the values of input resistors 11 and 12 is equal to the ratio between the values of the feedback resistors 13 and 14—14', the current supplied by the generator is given by the equation $I_p = -(e_i/R)$ where R is the value of resistor 12 which is connected to ground. Load impedance 3 is connected between the common point to resistors 14 and 14' and ground.

Although the generation of input signal $e_i$ is irrelevant with regard to the invention, it is assumed that the position of remotely controlled load 3 is detected by a sensor 30 connected to a subtraction circuit 5 which also receives the voltage drop across resistor 14. The output of subtraction circuit 5 is connected to the control input of main generator 1.

The auxiliary generator arrangement 2 comprises essentially an operational amplifier 20 mounted as a unity follower, an analog store element 21 such as a capacitor and an inverter switch 23. The output of amplifier 20 is directly connected to the inverting input of the amplifier by lead 22 and the non-grounded terminal of store element 21 is directly connected to the non-inverting input of amplifier 20. It is well known that the voltage at the output (and consequently at the inverting input) of a unity follower is equal to the voltage applied to the non-inverting input.

The terminals 101–102 of main current generator 1 are connected to the terminals 201–202 of the auxiliary current generator by a non-grounded conductor 4 and a grounded conductor 4'. Terminal 201 is connected to the movable contact 24 of inverter switch 23 and in position 24' of said movable contact it is connected to store element 21 and in position 24'' to the output terminal of operational amplifier 20. Also shown in the FIGURE are the ground connection 203 of amplifier 20 and the connections 204 and 205 thereof to the positive and negative potential terminals of the power supply.

In view of the explanation which will follow, it is to be pointed out that the output impedance of main generator 1 is high with respect to the resistance of the load 3 and the output impedance of auxiliary generator 2 is low with respect to the load resistance. In other words, the main generator is a variable current injector and the auxiliary generator is a variable voltage generator.

The sequence of use and the mode of operation of the auxiliary generator 2 are as follows.

Inverter switch 23 is first placed in position 24' whereby the analog store 21 immediately memorizes a voltage equal to the actual output voltage $V_p$ of main generator 1. It may be assumed that such main generator output voltage $V_p$ remains practically constant for the whole and very short duration of the switchover.

Then inverter switch 23 is switched over to position 24''. Amplifier 20 provides a current $I_s$ such that its output voltage is equal to the stored voltage $V_p$. Thus $I_s=I_c$ and the current flowing through the load does not undergo any change. It is to be noticed here that the voltage supplied to the load is imposed by the auxiliary generator 2 whatever may be the output current of generator 1. It is therefore possible to vary in any desired manner the main generator output current $I_p$ without effecting any variation in the load voltage $V_p$ nor in the load current $I_c$.

Whatever the value of current $I_p$ generated by main generator 1, still assumed to be connected, the auxiliary generator 2, and more precisely the amplifier 20, provides a current $I_s$ of the desired value in order to maintain the voltage $V_p$; in other words, algebraically, one constantly has:

$$I_c = I_p + I_s$$

It will be noticed that at any given moment the operator can be made aware of current $I_c$ circulating in the load by deriving the algebraic sum of currents $I_p$ and $I_s$ as read on ammeters 19 and 29, respectively.

Specifically, if generator 1 is removed for repair and/or overhaul, current $I_c$ is entirely provided by amplifier 20:

$$I_c = I_s$$

Hence, when the time comes to reset generator 1 or a spare into operation, the procedure is as follows:

Once generator 1 is connected as per diagram of the single FIGURE, all that is required is to actuate it manually to bring current $I_s$ (as per indications displayed by ammeter 29) to zero. The auxiliary generator 2 can then be disconnected.

Auxiliary current generator 2 is not designed to be automatically controlled like main current generator 1. It is only manually controlled by means of push-buttons 25 and 26 which selectively connect the negative and positive potential terminals of the power supply to capacitor 21 through resistors 27 and 28 respectively.

What I claim is:

1. A variable control current generator arrangement for remotely controlling the current applied to a load component such as a servo motor comprising:
 a main variable current generator connected to the terminals of said load component;
 said main variable current generator comprising a first operational amplifier having input resistors connected to the input terminals thereof and a transistor amplifier cascaded with said first operational amplifier and having an output circuit including an output resistor and said load component;
 feedback resistors respectively connecting the terminals of said output resistor to the input terminals of said first operational amplifier, the ratio between the input resistor values and the ratio between a feedback resistor value and the value of the serially connected output resistor and other feedback resistor being substantially equal, whereby said main variable current generator injects into the load component a current proportional to the voltage applied across its input resistors;
 a second operational amplifier arranged in unity follower fashion;
 an analog voltage store means permanently connected to the first input of said second operational amplifier; and
 an inverter switch means selectively connecting the terminals of said load component to said analog store means and to the second input of said second operational amplifier, whereby the analog voltage store means stores the voltage drop across the load component and the second operational amplifier applies to the load component a current equal to the current applied thereto before the switching of the inverter switch means.

2. A variable control current generator arrangement for remotely controlling the position of a load component such as a servo motor comprising:
 a main variable current generator connected to the terminals of said load component;
 said main variable current generator comprising a first operational amplifier having input resistors connected to the input terminals thereof and a transistor amplifier cascaded with said first operational amplifier and having an output circuit including an output resistor and said load component;
 feedback resistors respectively connecting the terminals of said output resistor to the input terminals of said first operational amplifier, the ratio between the input resistor values and the ratio between a feedback resistor value and the value of the serially connected output resistor and other feedback resistor being substantially equal, whereby said main variable current generator injects into the load component a current proportional to the voltage applied across its input resistors;
 a sensor means generating a voltage representing the position of the remotely controlled load component;
 a subtraction circuit for subtracting said load component position representing voltage from the voltage drop across said output resistor and generating a difference voltage;
 means for applying said difference voltage to said first operational amplifier input resistors;
 a second operational amplifier arranged in unity follower fashion;
 an analog voltage store means permanently connected to the first input of said second operational amplifier; and
 an inverter switch means selectively connecting the terminals of said load component to said analog store means and to the second input of said second operational amplifier, whereby the analog voltage store means stores the voltage drop across the load component and the second operational amplifier applied to the load component a current equal to the current applied thereto before the switching of the inverter switch means which results in an absence of any change of the load component position during switching of the inverter switch means.

* * * * *